(12) United States Patent
Perry et al.

(10) Patent No.: US 11,705,823 B2
(45) Date of Patent: Jul. 18, 2023

(54) DOUBLE-ENDED DUAL MAGNETIC DC-DC SWITCHING POWER CONVERTER WITH STACKED SECONDARY WINDINGS AND AN AC COUPLED OUTPUT

(71) Applicant: Raytheon Company, Waltham, MA (US)

(72) Inventors: Marty Perry, Tucson, AZ (US); Robert J. Schaller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 26 days.

(21) Appl. No.: 17/546,642

(22) Filed: Dec. 9, 2021

(65) Prior Publication Data

US 2023/0188048 A1    Jun. 15, 2023

(51) Int. Cl.
*H02M 3/335*    (2006.01)
(52) U.S. Cl.
CPC ............................. *H02M 3/33592* (2013.01)
(58) Field of Classification Search
CPC ................................................ H02M 3/33592
See application file for complete search history.

(56) References Cited

U.S. PATENT DOCUMENTS

| 5,754,413 A  | * | 5/1998 | Fraidlin | ............ | H02M 3/33571 |
| | | | | | 363/16 |
| 6,765,810 B2 | | 7/2004 | Perry | | |
| 8,154,891 B1 | * | 4/2012 | Morico | ............... | H02M 3/3376 |
| | | | | | 363/61 |

* cited by examiner

*Primary Examiner* — Adolf D Berhane
*Assistant Examiner* — Afework S Demisse
(74) *Attorney, Agent, or Firm* — Schwegman Lundberg & Woessner, P.A.

(57) ABSTRACT

A topology for double-ended dual magnetic DC-DC SPC ("Voltage Doubler") for all else being equal provides twice the output voltage as the conventional topology. The Voltage Doubler differs in that the secondary configuration is stacked in series as compared to the conventional topology in which the secondary configuration of the dual magnetics are in parallel. The output current is AC coupled rather than DC coupled to the load thereby doubling the output voltage. Because of the AC coupling, the Voltage Doubler is configured to automatically maintain balance of the secondary capacitors. During reset of the magnetics, the primary windings are shorted and both synchronous rectifier switches are closed. Due to transformer action, the output capacitors are connected to the output such that charge equalization forces the voltage on each capacitor to be equal.

20 Claims, 9 Drawing Sheets

|    | STATE A | STATE B | STATE C | STATE D | STATE A | STATE B |
|----|---------|---------|---------|---------|---------|---------|
| I3 | 0 | I1 | I1+I2 | I1 | 0 | I1 |
| I4 | I1+I2 | I2 | 0 | I2 | I1+I2 | I1 |
| I5 | $\frac{I4}{2}$ | 0 | $\frac{I3}{2}$ | 0 | $\frac{I4}{2}$ | 0 |
| I6 | $\frac{-I4}{2}$ | 0 | $\frac{-I3}{2}$ | 0 | $\frac{-I4}{2}$ | 0 |
| I7 | $\frac{I4}{2}$ | $\frac{I3+I4}{4}$ | $\frac{I3}{2}$ | $\frac{I3+I4}{4}$ | $\frac{I4}{2}$ | $\frac{I3+I4}{4}$ |

| STATE | A | | B | | C | | D | |
|---|---|---|---|---|---|---|---|---|
| PATTERN | ON | OFF | ON | OFF | ON | OFF | ON | OFF |
| 1 | S1, S4, S6 | S2, S3, S5 | S2, S4, S5, S6 | S1, S3 | S3, S2, S5 | S1, S4, S6 | S2, S4, S5, S6 | S1, S3 |
| 2 | S1, S4, S6 | S2, S3, S5 | S1, S3, S5, S6 | S2, S4 | S3, S2, S5 | S1, S4, S6 | S1, S3, S5, S6 | S2, S4 |
| 3 | S1, S4, S6 | S2, S3, S5 | S1, S3, S5, S6 | S2, S4 | S3, S2, S5 | S1, S4, S6 | S2, S4, S5, S6 | S1, S3 |
| 4 | S1, S4, S6 | S2, S3, S5 | S2, S4, S5, S6 | S1, S3 | S3, S2, S5 | S1, S4, S6 | S1, S3, S5, S6 | S1, S3 |

DOUBLE-ENDED DUAL MAGNETIC DC-DC SWITCHING POWER CONVERTER WITH STACKED SECONDARY WINDINGS AND AN AC COUPLED OUTPUT

BACKGROUND OF THE INVENTION

Field of the Invention

This invention relates to DC-DC power conversion and more particular to double-ended dual magnetic DC-DC switching power converters (SPCs).

Description of the Related Art

DC-DC power converters are power-processing circuits that convert an unregulated DC input voltage to a regulated DC output voltage, usually at a different level, for powering a load. A vast variety of topologies for DC-DC converters have been introduced over the years, but not all are suitable for step-up or bus conversion applications. Further, the need for small size and high efficiency places additional limitations on the available topologies. Small size equates to high power density, and power density is the ratio of output power capability to converter volume.

A DC-DC switching power converter (SPC) has an energy storage section, a switching control circuit such as a pulse width modulator (PWM), a primary switch, and a rectifier. The energy storage section is responsive to the selective application of the DC input voltage to produce a current and the regulated DC output voltage. The switching control circuit, primary switch and rectifier control the application of the DC input voltage to the energy storage section to set the value of the regulated DC output voltage.

Power density is a key characteristic of power converters. To achieve high power density the losses must be low and the magnetic elements must be optimized. In very high density power converters the magnetic elements are typically implemented in planar form to realize the most compact size with reduced unwanted parasitic elements. Optimization of planar magnetics through the reduction in total winding turns is desired to realize the performance of the converter.

Double-ended DC-DC SPCs are well known in the art and are a fundamental topology to achieve high power density. Examples include the half bridge and full bridge converter. A characteristic of double-ended converters is that the input source is applied with opposite polarity on alternating switching cycles to the primary allowing for reduced RMS (root-mean-squared) currents as compared to single ended topologies.

Double-ended dual magnetic SPCs have the advantages of the conventional half bridge and full bridge converters with the added benefit of magnetics integration whereby the transformer and energy storage magnetic elements are combined into dual opposing interleaved elements that are summed at the output. The secondary configuration of the dual magnetics are in parallel and the summed output currents are always directly coupled (DC coupled) to the output in this topology thus the output capacitor only serves as a filter element and does not directly support the output voltage during any state of the converter operation.

Figure 1A:
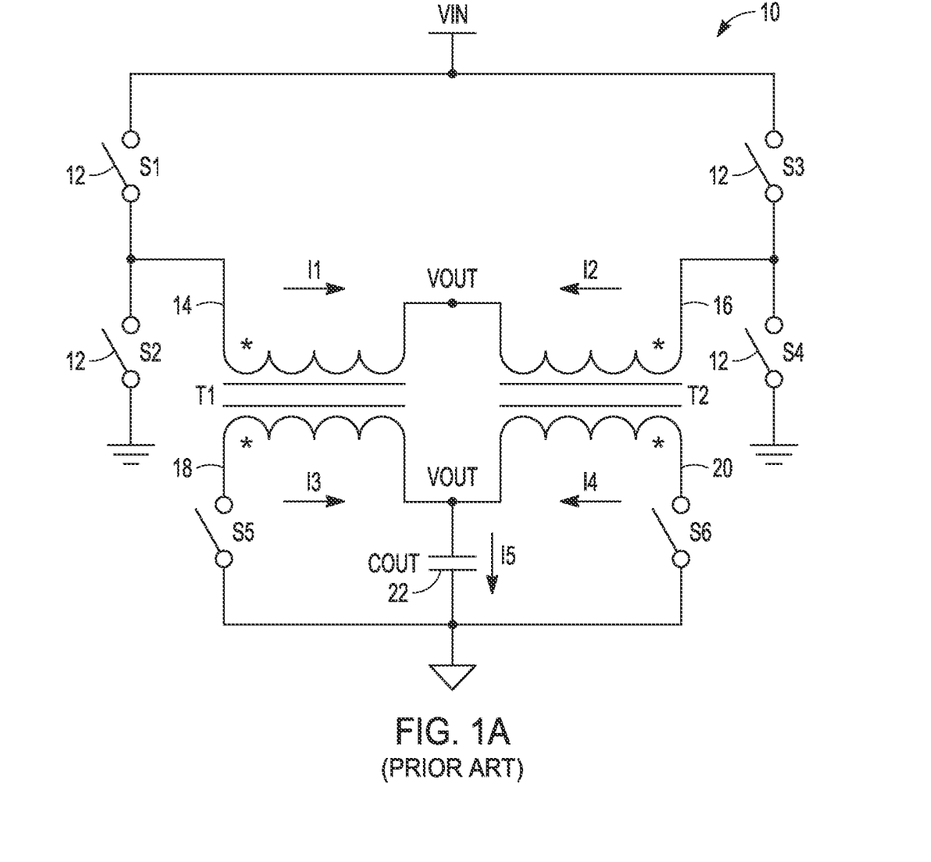
FIGS. 1A and 1B, as described above, are a schematic diagram of a known embodiment of a double-ended dual magnetic DC-DC switching power converter (SPC) in which the output currents are DC: coupled to the output.
Figure 1B:
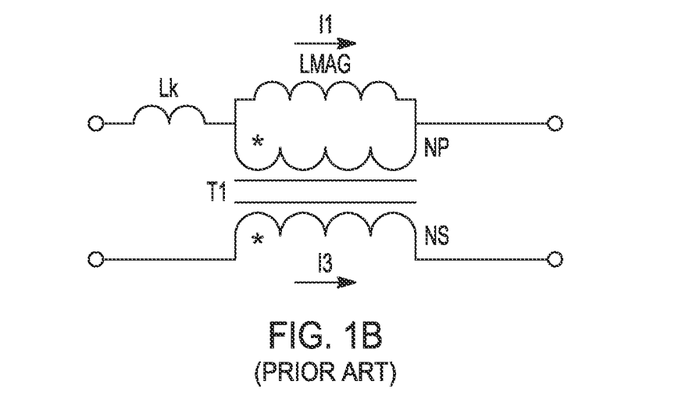

As shown in FIGS. 1A and 1B, a conventional topology of a double-ended dual magnetic SPC 10 includes a pair of transformers T1, T2 and a double-ended input circuit 12 (switches S1, S2, S3 and S4) for generating an alternating voltage Vin across the primary windings 14, 16 of the transformers T1, T2 as per conventional double-ended configurations. T1, T2 are combined transformers-inductors. The second transformer T2 serves as the filter inductor for the first transformer T1 during a first ON period of switches S1, S4 and the first transformer T1 serves as the filter inductor for the second transformer T2 during a second ON period of switches S2, S3. As shown in FIG. 1B, a transformer is not ideal, it includes inductance Lmag in parallel with the primary winding and a series inductance Lk. As used herein, the "primary winding current" i1 (or i2) is the current that flows through inductance Lmag.

Each transformer T1, T2 includes a secondary winding, 18 or 20, and the primary to secondary turns ratios N=Np/Ns of the two transformers T1, T2 may be identical. Each secondary winding 18, 20 is connected to a switch (S5, S6) and permits energy transfer as in a forward converter, and also provides for discharge of stored energy as in a flyback converter. These two transformer actions can occur simultaneously. An output capacitor Cout 22 is connected across the load (not shown) for providing output filtering, For the conventional topology the output voltage Vout is given by:

$$Vout=Vin*(D/2*N) \qquad (1)$$

where D is the duty factor (ratio of time S1 is closed to the period of signal clock) and N is the turns ratio of the primary winding to the secondary winding.

U.S. Pat. No. 6,765,810 discloses a switching pattern that incorporates control for the synchronous rectifier switches S5, S6. Synchronous rectifier switches replace conventional passive diode rectifiers in the output rectification stage resulting in reduced losses and greater efficiency. In this particular implementation during the state where the primary magnetic is disconnected from source Vin the switching pattern opens all four primary switches (S1, S2, S3, S4) and closes the synchronous rectifier switches S5, S6 to reset the magnetics. Energy can ring during the reset period in the primary circuit.

Other patterns for switching a full bridge double-ended dual magnetic converter are possible. For example to minimize losses during the transition from the A to B and C to D states a pattern that shorts the primary terminal of the dual opposed magnetic elements during the B and D states may be used. During the B and D states the primary terminals of T1 and T2 are shorted by closing S2 and S4. This approach better confines energy during the reset period. Other means of shorting the primary terminals of T1 and T2 can be achieved. For example S1 and S3 could be closed during states B and D or the shorting could alternate between S1, S3 and S2, S4 on alternate cycles. Various patterns achieving partial or complete shorting of the primary could be developed by those skilled in the art.

SUMMARY OF THE INVENTION

The following is a summary of the invention in order to provide a basic understanding of some aspects of the invention. This summary is not intended to identify key or critical elements of the invention or to delineate the scope of the invention. lits sole purpose is to present some concepts of the invention in a simplified form as a prelude to the more detailed description and the defining claims that are presented later.

The present invention provides a different topology for double-ended dual magnetic DC-DC SPC hereafter referred to as a "Voltage Doubler" for conciseness that for all else being equal provides twice the output voltage as the conventional topology. The Voltage Doubler differs in that the secondary configuration is stacked in series as compared to the conventional topology in which the secondary configuration of the dual magnetics are in parallel. With the secondary outputs in series, the state table is drastically different in that the output capacitors (C1, C2) for each secondary winding supply energy to the output on alternate half cycles. The Voltage Doubler's output current is AC coupled to the load during the A and C states as compared to being DC coupled. Due to the series configuration the output voltage Vout is equally divided between the secondaries, and thus for a given set of conditions (Vin, D and N) the output voltage Vout=Vin*(D/N) is twice that of the conventional topology.

Since the output capacitors (C1 and C2) store and then deliver energy to the load, the voltages on C1 and C2 may drift from the ideal state of VC1=VC2=Vout/2 due, for example, to non-identical timing, component tolerances and or transient events on the input or output. This is not an issue in the DC coupled conventional topology. The Voltage Doubler is configured to automatically maintain balance of the secondary capacitors. During states B and D, the primary windings are shorted and both synchronous rectifier switches are closed. Due to transformer action, capacitors C1 and C2 are connected to the output such that charge equalization forces the voltage on each capacitor to be equal. Thus charge balance between the output capacitors is forced automatically on a cycle-by-cycle basis. The reset period in states B and D is used to both reset the magnetics and to charge balance the output capacitors.

In an embodiment, a "conversion cell" includes a transformer having a primary winding and at least one secondary winding with each winding connected between a pair of terminals. Each secondary winding is connected to an output capacitor and a synchronous rectifier switch (SRS) to form a loop. A Voltage Doubler includes first and second conversion sections with each section including one or more conversion cells which may be isolated, connected in parallel, connected in series or a combination thereof to support multiple outputs, increased power or increased voltage delivered to the load. The first and second sections are "stacked" to series-connect the primary windings and to series-connected effective output capacitances across the one or more outputs.

A control circuit controls a plurality of primary switches to generate an alternating input voltage Vin across the series-connected primary windings in States A and C and to disconnect the input voltage Vin and short the primary windings in States B and D. In states A and C the control circuit switches the synchronous rectifier switches in the first and second conversion sections in opposition to each other to alternately connect the secondary windings to the output to AC couple secondary winding currents through the effective output capacitances C1eff and C2eff on alternate half cycles of the alternating input voltage Vin to source an output current at each output such that an output voltage Vout=VC1eff=VC2eff. In states B and D the control circuit closes both synchronous rectifier switches to connect the effective output capacitances C1eff and C2eff to the output to equalize the voltages VC1eff and VC2eff. Vout=Vin*(D/Neff) where D is a duty factor and Neff is effective turns ratio of the first and second transformers.

In a base topology, each conversion section includes a single conversion cell having a single secondary winding. Output capacitors C1 and C2 are series-connected across a single output to produce a Vout=VC1+VC2=Vin*(D/N) where N is the turns ratio of the first and second transformers.

In another embodiment the Voltage Doubler is configured to produce O outputs where O>1 from the single pair of transformers T1 and T2. Each conversion section includes a single conversion cell having P=O secondary windings. The P loops in the first and second sections are "stacked"O and series-connected to generate Vout(i)=VC(i)+VC2(i) for i=1 to O. The output voltages may or may not be the same depending on the number of turns in each secondary winding. This configuration uses a single transformer pair to source power to multiple loads. Each load can draw power as needed provided that the total load power does not exceed the power rating of the Voltage Doubler. Alternately, the Voltage Doubler can be configured using conversion cells with a single secondary winding (p=1) to support O outputs by adding additional transformer pairs.

In another embodiment, the Voltage Doubler is configured to increase the output power that can be delivered to the load with Vout. Each conversion section includes Q conversion cells each having a single secondary winding. The Q loops are connected in parallel within a given conversion section whereby the Q transformers source additional current through an effective capacitance to deliver more power to the load. Furthermore, dividing the power across multiple transformers reduces loss. Alternately, the output power delivered to the load may not change but each conversion cell is now only required to provide 1/2Q of the output power.

In another embodiment, the Voltage Doubler is configured to increase the output voltage Vout that can be delivered to the load. Each conversion section includes R conversion cells each having a single secondary winding. The R loops are connected in series within a given conversion section such that the R transformers source current through an effective capacitance to multiply the voltage generated by each conversion section by R. If one conversion cell per section generates an output voltage of Vout, this configuration will generate an output voltage Vout*=R*Vout. Alternately, Vout may not change but each conversion cell is now only required to provide 1/2R*Vout.

In a general topology, each of the conversion sections may include (O/P)*(Q*R conversion cells that are isolated, connected in parallel, connected in series or a combination thereof within each conversion section to support O outputs with increased power delivered to the load or increased output voltage delivered to the load.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a different topology for double-ended dual magnetic DC-DC SPC hereafter referred to as a "Voltage Doubler" for conciseness that for all else being equal provides twice the output voltage as the conventional topology. The Voltage Doubler differs in that the secondary configuration is stacked in series as compared to the conventional topology in which the secondary configuration of the dual magnetics are in parallel. With the secondary outputs in series, the state table is drastically different in that the output capacitors (C1, C2) for each secondary winding supply energy to the output on alternate half cycles. The Voltage Doubler's output current is AC coupled to the load during the A and C states as compared to being DC coupled. Due to the series configuration the output voltage Vout is equally divided between the secondaries, and thus for a. given set of conditions (Vin, D and N) the output voltage Vout=Vin*(D/N) is twice that of the conventional topology.

Since the output capacitors (C1 and C2) store and then deliver energy to the load, the voltages on C1 and C2 may drift from the ideal state of VC1=VC2=Vout/2 due, for example, to non-identical timing, component tolerances and or transient events on the input or output. This is not an issue in the DC coupled conventional topology. The Voltage Doubler is configured to automatically maintain balance of the secondary capacitors. During states B and D, the primary windings are shorted and both synchronous rectifier switches are closed. Due to transformer action, capacitors C1 and C2 are connected to the output such that charge equalization forces the voltage on each capacitor to be equal. Thus charge balance between the output capacitors is forced automatically on a cycle-by-cycle basis. The reset period in states B and D is used to both reset the magnetics and to charge balance the output capacitors.

A "conversion cell" includes a transformer having a primary winding and at least one secondary winding with each winding connected between a pair of terminals. Each secondary winding is connected to an output capacitor and a synchronous rectifier switch (SRS) to form a secondary loop. A Voltage Doubler includes first and second conversion sections with each section including one or more conversion cells which may be isolated, connected in parallel, connected in series or a combination thereof to support multiple outputs, increased power or increased voltage delivered to the load. The first and second sections are "stacked" to series-connect the primary windings and to series-connected effective output capacitances across the one or more outputs.

Referring now to FIGS. 2A, 2B and 2C, 3 and 4, an embodiment of a base topology of a Voltage Doubler 100 includes a pair of stacked conversion sections 102 and 104 and a double-ended input circuit 106 (switches S1, S2, S3 and S4) for generating an alternating voltage Vin as per conventional double-ended configurations that is converted to a DC output voltage Vout at output 108 to deliver power to a load (not shown). The conversion sections 102 and 104 each include one more conversion cells 110 and 112, respectively (only one in this configuration). Conversion cell 110 includes a first transformer T1 having a primary winding 114 and a secondary winding 116. A secondary loop 118 connects secondary winding 116, an output capacitor C1 and a SRS S5. Conversion cell 112 includes a second transformer T2 having a primary winding 120 and a secondary winding 122. A secondary loop 124 connects secondary winding 122, an output capacitor C2 and a SRS S5. C1 and C2 are preferably but not necessarily equal. The turns ratio N=Np/Ns where Np is the primary turns and Ns is the secondary turns is the same for both cells. As per convention, each primary and secondary winding may be a single winding or a combination of parallel and series windings. Conversion sections 102 and 104 are "stacked" to series-connect primary windings 114 and 120 and to series-connect output capacitors C1 and C2 between output 108 and ground.

Figure 2A:
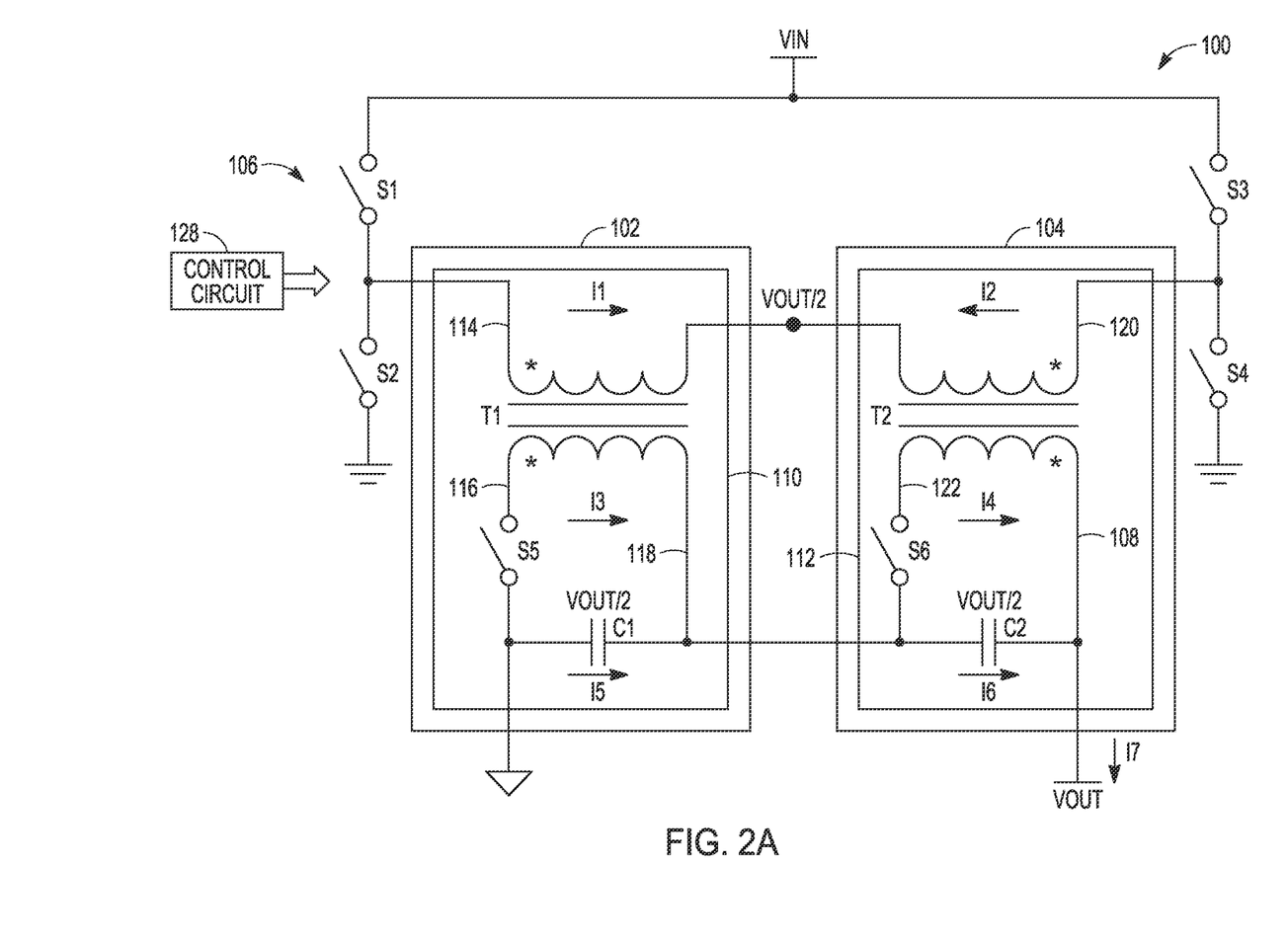
FIGS. 2A, 2B and 2C are a schematic, a state diagrams and an exemplary switching pattern for an embodiment of a Voltage Doubler in which the secondary windings are stacked and the output currents are AC coupled to the output.

T1, T2 are combined transformers-inductors. The second transformer T2 serves as the filter inductor for the first transformer T1 during a first ON period of switches S1, S4 and the first transformer T1 serves as the filter inductor for the second transformer T2 during a second ON period of switches S2, S3. As previously shown in FIG. 1B, a transformer is not ideal, it includes inductance Lmag in parallel with the primary winding and a series inductance Lk. As previously defined the "primary winding current" i1 (or i2) is the current that flows through inductance Lmag.

Secondary winding currents i3 and i4 flow through secondary windings 116 and 122, respectively, and i5 and i6 through output capacitors C1 and C2, respectively, to form a load current i7 at output 108.

Figure 2B:
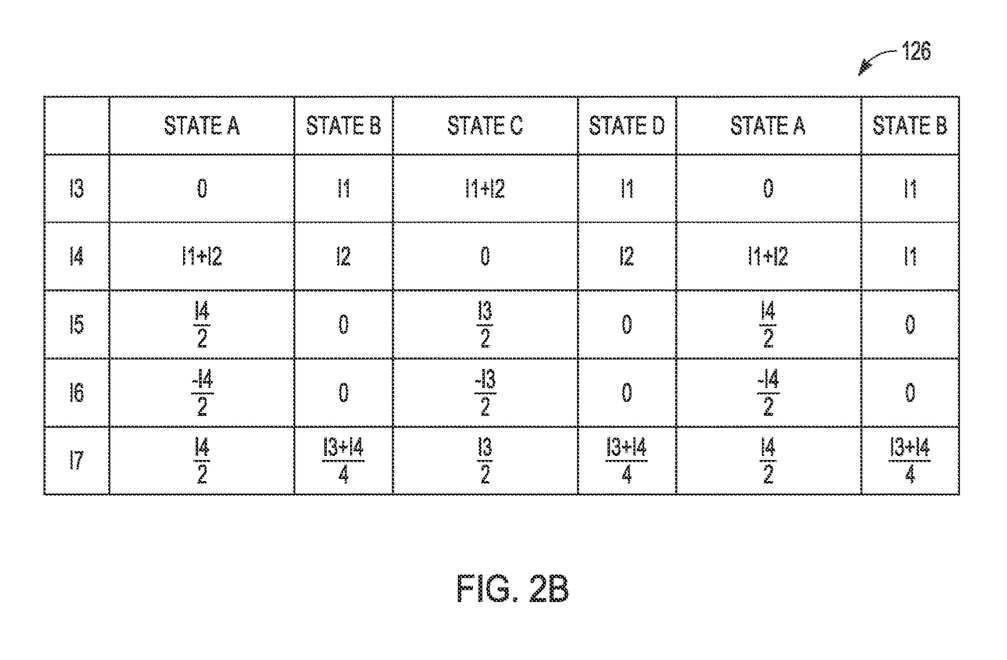

In general there are 3 modes of operation that can be described by 4 states A, B, C and D as shown in State Table 126 in FIG. 2B. The basic modes are 1: Connect the input source Vin to the primary windings of the dual opposed magnetic in a given polarity while one secondary winding is connected to its associated output capacitor through a closed secondary switch 2: Short the primary windings while simultaneously connecting both secondary windings to their associated output capacitors through closed secondary switches and 3: The same as mode 1 with the polarity reversed and the opposite secondary winding connected to its associated output capacitor through a closed secondary switch The cycle is composed of 4 states with the cycle being Mode 1 followed by Mode 2 followed by Mode 3 followed by Mode 2 followed by Mode 1 and so forth.

A control circuit 126 controls switches S1, S2, S3 and S4 to generate an alternating input voltage Vin across the series-connected primary windings in States A and C and to disconnect the input voltage Vin and short the primary windings in States B and D.

Figure 3:
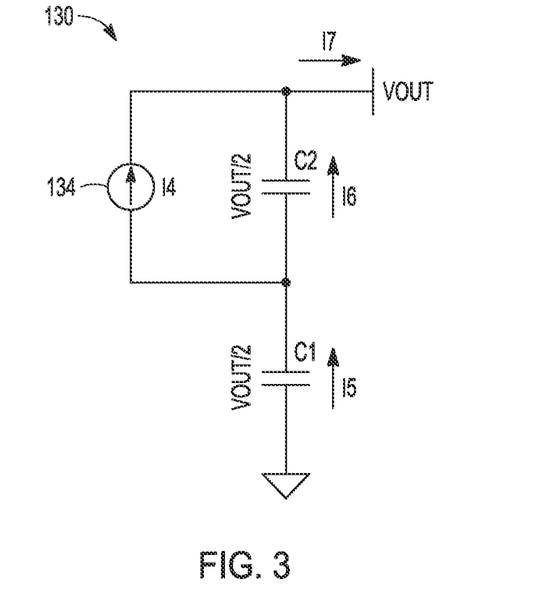
FIG. 3 is a schematic diagram of an equivalent circuit for the Voltage Doubler shown in FIG. 2A in State A.

In states A and C the control circuit switches the synchronous rectifier switches in the first and second conversion sections in opposition to each other to alternately connect the secondary windings to the output to AC couple secondary winding currents (e.g., i3/2 and i4/2) through the effective output capacitances C1 and C2 on alternate half cycles of the alternating input voltage Vin to source an output current i7 at output 108 such that an output voltage Vout=VC1+VC2. As shown in FIG. 3, an equivalent circuit 130 for the Voltage Doubler in State A shows that ½ Vout is supported by output capacitor C1 (VC1=Vout/2) with an AC coupled load current of i7=i5=i4/2 supplied by a current source 132 of secondary winding current i4 through output capacitor C2 providing the other half. Half of the secondary winding current i4 is used as current i6 to recharge output capacitor C2 and returns to i4 and half of the secondary winding current i4 is delivered to the load and returns as i5 to discharge output capacitor C1 and returns to i4. In State C the equivalent circuit is flipped whereby C2 supports ½ Vout and an AC coupled load current i7=i6=i3/2 provides the other half. Thus as compared to the conventional topology the output current of the Voltage Doubler is AC coupled to the load during the A and C states.

Thus, the Voltage Doubler generates an output voltage Vout that is twice that of the conventional topology:

$$Vout=Vin*(D/N) \qquad (2)$$

where D is a duty factor and N is the turns ratio of the first and second transformers. Everything else being equal Voltage Doubler 100 produces twice the output voltage Vout as the conventional topology. If the power is constant, the sourced load current is one-half the conventional topology.

Figure 4:
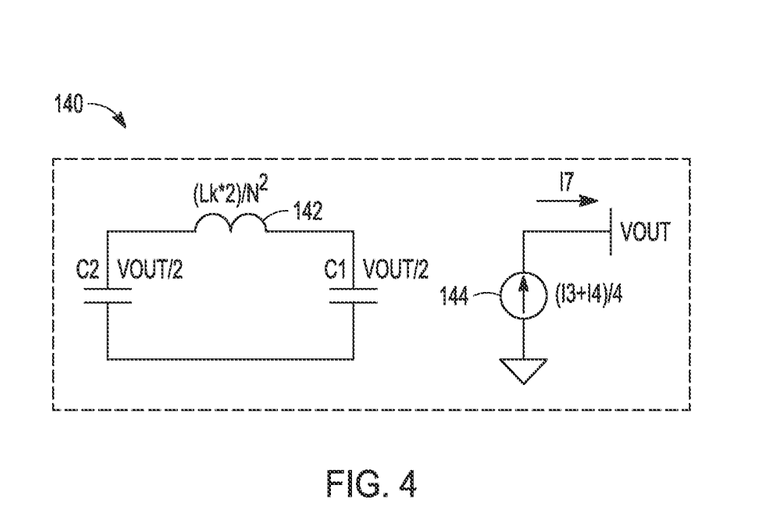
FIG. 4 is a schematic diagram of an equivalent circuit for the Voltage Doubler shown in FIG. 2A in State B.

In states B and D the control circuit closes both synchronous rectifier switches to connect the output capacitors C1 and C2 to the output 108 to equalize the voltages VC1 and VC. Due to transformer action, capacitors C1 and C2 are connected to the output such that charge equalization forces the voltage on each capacitor to be equal. Thus charge balance between the output capacitors is forced automatically on a cycle-by-cycle basis. The reset period in states B and D is used to both reset the magnetics and to charge balance the output capacitors, As shown in FIG. 4, an equivalent circuit 140 for the Voltage Doubler in State B or D shows that during States B or D the output capacitors C1 and C2 are connected together through an effective leakage inductance 142 (Lk*2)/N2 of transformers T1 and T2 with a current source 144 equal to (i3+i4)/4 supplying load current i7. C1 and C2 are series connected to form Vout. This resets the capacitor voltages and any charge imbalance between the two output capacitors is reset.

Figure 2C:
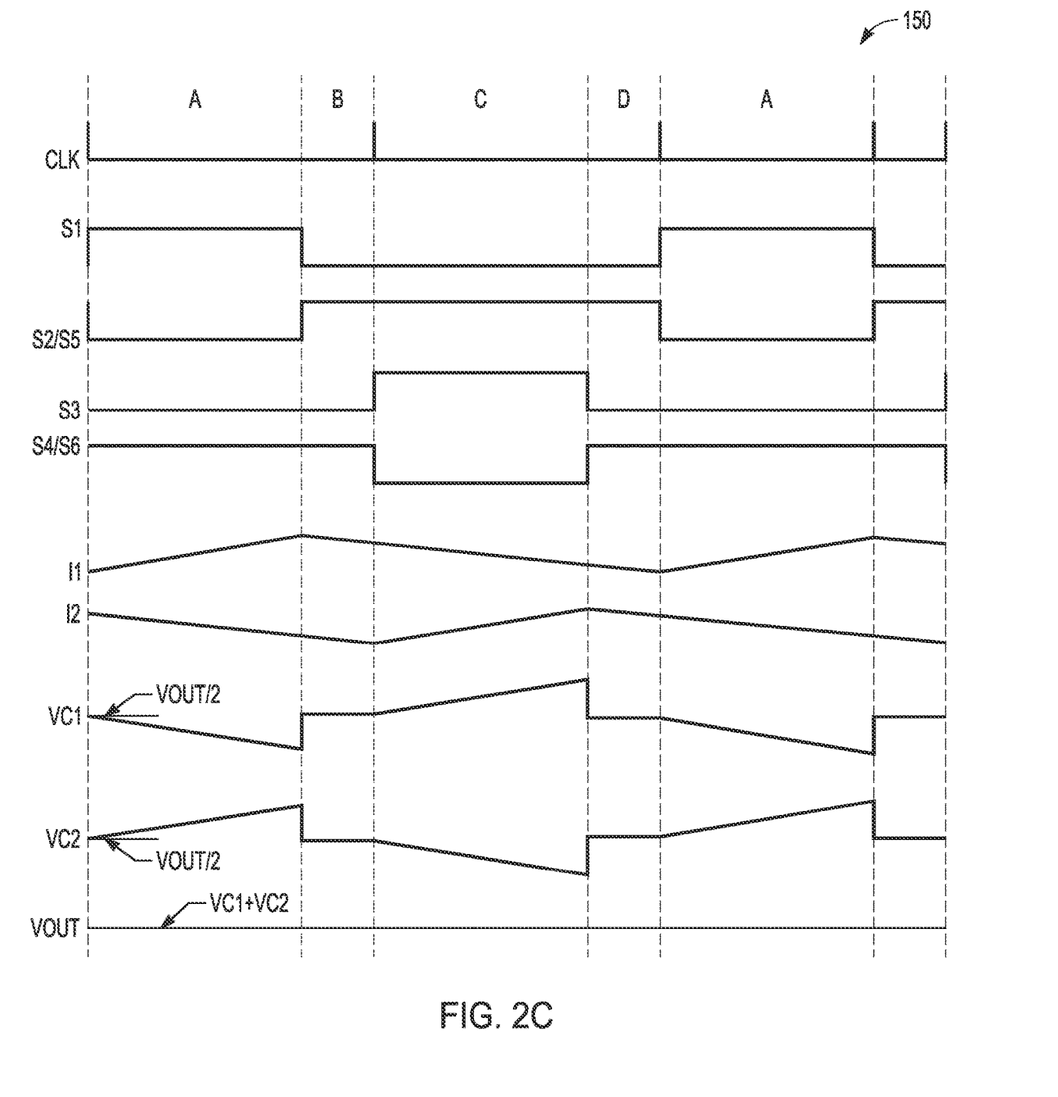

Referring now to FIG. 2C, an embodiment of a switching pattern 150 that can be applied to Voltage Doubler 100 to produce State Table 126 is depicted.

For State A, switches S1, S4, S6 are ON (CLOSED) and switches S2, S3, S5 are OFF (OPEN) causing secondary winding current equal to the sum of the primary winding currents (i4=i1+i2) to flow through secondary winding 122. Half of this current is AC coupled through output capacitor C2 to the output where Vout=VC1+VC2

For States B and D, switches S2, S4, S5, S6 are ON (CLOSED) and switches S1, S3 are OFF (OPEN) which disconnects the input voltage Vin and shorts the primary windings 114 and 120. Closing the SRS switches S5 and S6 connects the output capacitors C1 and C2 to the output and sources a load current equal to the sum of the secondary currents divided by two i7=(i3+i4)/4 to equalize voltages VC1 and VC2 to set any charge imbalance between the capacitors.

For State C, switches S2, S3, S5 are ON (CLOSED) and switches S1, S4, S6 are OFF (OPEN) thereby applying an input voltage of the opposite polarity across the primary windings causing secondary winding current equal to the sum of the primary winding currents (i3=i1+i2) to flow through secondary winding 126. Half of this current is AC coupled through output capacitor C2 to the output where Vout=VC1+VC2.

Figure 5:
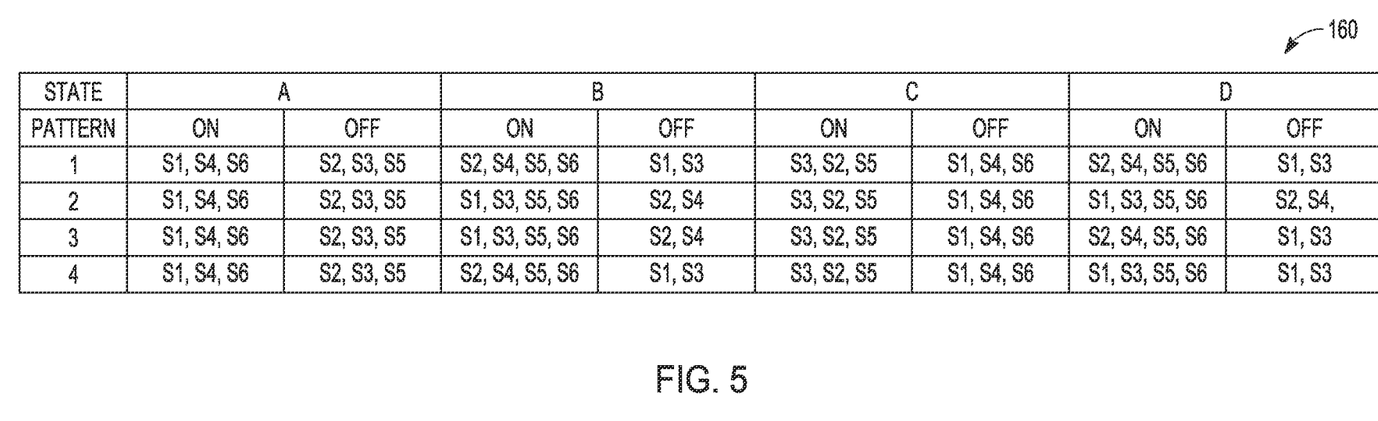
FIG. 5 is a table of alternate switching patterns to provide the three modes of operation.

There are many different permutations of the switching patterns that support the 3 different modes and 4 states a number of which are shown in Table 160 in FIG. 5 for the Voltage Doubler topology given the transformer dot notation identified in the various figures. These consist of different and or alternating ways of cycling S1, S2, S3 and S4 to achieve alternating polarity followed by a shorted state. Additionally the patterns can be revised depending on the dot notation of the transformers. For example with the dot notation shown in FIG. 2A, the primary junction of T1 and T2 will be Vout and during state A (S6 closed, S5 open) the primary of T1 will have a voltage of Vitt-Vow impressed across it and the primary of T2 will have Vout impressed across it. If the dot notations of the transformers are revised one could devise a configuration that for state A with S6 open and S5 closed the primary of T1 would have a voltage of Vout impressed across it and the primary of T2 would have a voltage of Vin-Vout impressed across it. For this case the primary junction of T1 and T2 will now have a square wave wherein during states A and C the voltage will be Vin-Vout and during states B and D will be Vout.

The base topology of the Voltage Divider shown in FIG. 2A can be scaled or generalized to provide multiple outputs at the same or different Vout, to provide more power at each output, to provide a higher output voltage Vout at each output or a combination thereof. This is accomplished by providing each conversion section with multiple conversion cells and connecting those cells between the sections (multiple outputs) or in parallel or in series within the section (increased power or voltage).

Figure 6:
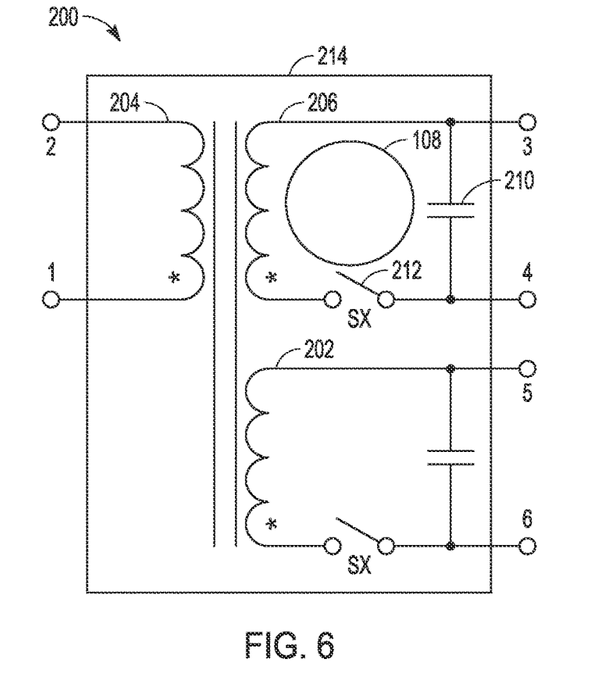
FIG. 6 is a an embodiment of a conversion cell including a single transformer having a single primary winding and P secondary windings.

As shown in FIG. 6, a conversion cell 200 includes a single transformer 202 having a single primary winding 204 and P secondary windings 206 where P is an integer of one or more. The cell includes P secondary loops 208 each connecting one of the secondary windings 206, an output capacitor 210 and a SRS 212. A package 214 includes a pair of terminals 1 and 2 on either side of primary winding 204, a pair of terminals 3 and 4 on either side of the output capacitor 210 in the first secondary loop, a pair of terminals 5 and 6 on either side of the output capacitor 210 in the second secondary loop and so forth.

To form the base topology of the Voltage Doubler shown in FIG. 2A, a single pair of conversion cells with P=1 would be stacked with terminal 2 of a first conversion cell connected to terminal 2 of a second conversion cell to series-connect the primary windings and terminal 3 of the first conversion cell connected to terminal 3 of the second conversion cell to series-connect the output capacitors. Terminal 4 of the first conversion cell would be connected to ground and terminal 4 of the second conversion cell would provide the output. A switching network could be connected to Terminals 1 of both cells and driven to produce Vout=VC1+VC2=Vin*(D/N) at the output.

Figure 7:
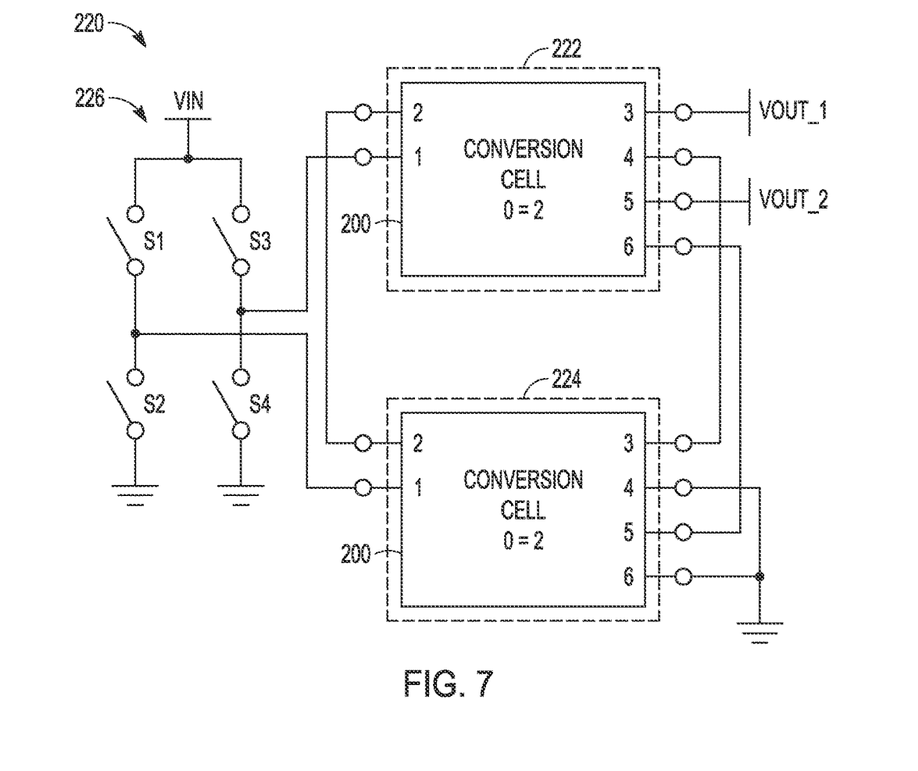
FIG. 7 is a an embodiment of a Voltage Doubler in which a pair of conversion cells with P=2 are configured to generate a pair of output voltages from a single transformer pair.

Referring now to FIG. 7, in another embodiment a Voltage Doubler 220 is configured to produce O outputs where O=2 in this example from a single pair of transformers T1 and T2. Each conversion section 222, 224 includes a single conversion cell 200 having P=O=2 secondary windings. The two secondary loops in each of the first and second sections 222, 224 are respectively "stacked" and series-connected to generate Vout(i)=VC(i)+VC2(i) for i=1 to O when driven by switching network 226. This configuration uses a single transformer pair to source power to multiple loads. Each load can draw power as needed provided that the total load power does not exceed the power rating of the Voltage Doubler.

For example, Terminal 2 of the conversion cell in conversion section 222 is connected to terminal 2 of the conversion cell in conversion section 224 to series-connect the primary windings. Terminal 4 of the conversion cell in conversion section 222 is connected to Terminal 3 of the conversion cell in conversion section 224 to series connect the $1^{st}$ secondary loops in each cell providing a $1^{st}$ output at Terminal 3 of the conversion cell in conversion section 222. Terminal 6 of the conversion cell in conversion section 222 is connected to Terminal 5 of the conversion cell in conversion section 224 to series connect the $2^{nd}$ secondary loops in each cell providing a $2^{nd}$ output at Terminal 5 of the conversion cell in conversion section 222. The output voltages Vout_1 and Vout_2 may or may not be the same depending on the number of turns in each secondary winding.

Figure 8:
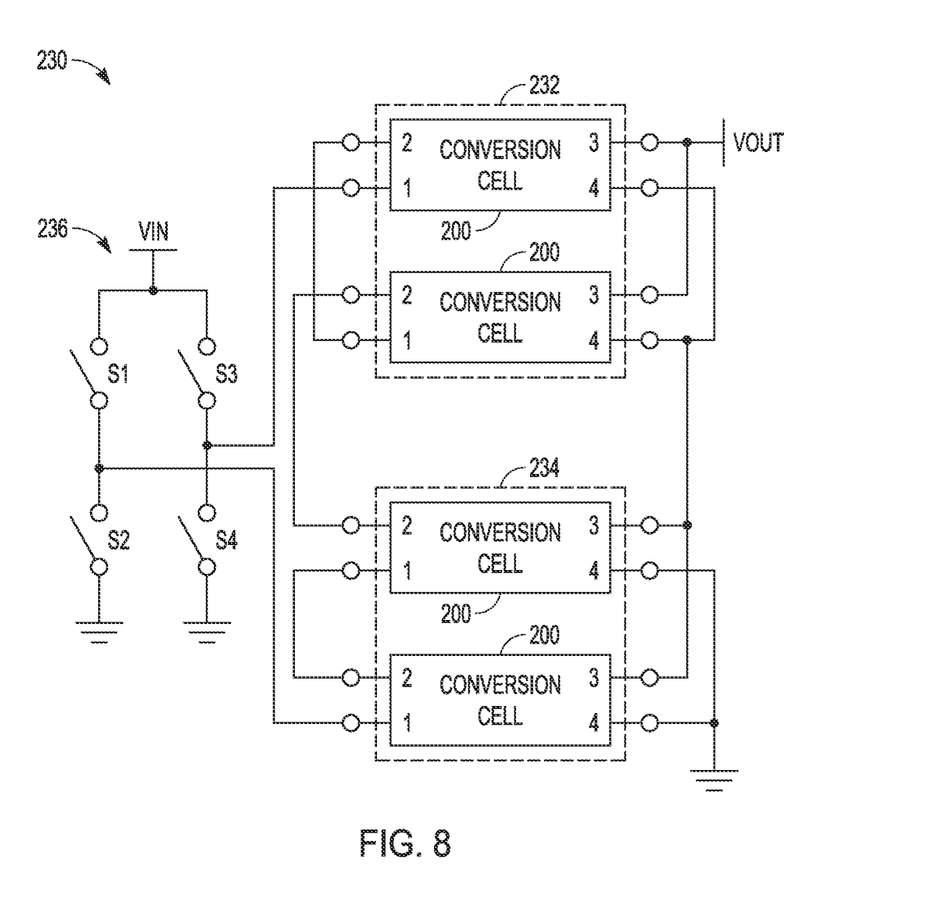
FIG. 8 is an embodiment of a Voltage Doubler in which conversion cells with P=1 are connected in parallel to introduce an additional transformer pair and increase output power delivered to the load at Vout.

Referring now to FIG. 8, in another embodiment, a Voltage Doubler 230 is configured to increase the output power that can be delivered to the load without sacrificing Vout. Each conversion section 232, 234 includes Q conversion cells 200 each having a single secondary winding where Q=2 in this example. The Q secondary loops are connected in parallel within a given conversion section. The conversion sections are "stacked" to series-connect the primary windings and series-connect the parallel combinations having effective capacitances C1eff and C2eff. When driven by a switching network 236 the Q transformers source additional current for each secondary loop through the effective capacitance C1eff, C2eff to deliver more power to the load without sacrificing the output voltage Vout. Furthermore, dividing the power across multiple transformers reduces loss. Alternately, the output power delivered to the load may not change but each conversion cell is now only required to provide 1/2Q of the output power.

For example, in conversion section 232 Terminal 2 of a top conversion cell 200 is connected to Terminal 1 of a bottom conversion cell 200 and in conversion section 234 Terminal 1 of a top conversion cell 200 is connected to Terminal 2 of a bottom conversion cell 200 to series-connect the primary windings. In each conversion section, the conversion cells' Terminal 3s are all connected together and Terminal 4s are all connected together to parallel-connect the cells within each section. The output for Vout is taken at the connection of all Terminal 3s in conversion section 232 with Terminal 4s in conversion section 234 connected to ground.

Figure 9:
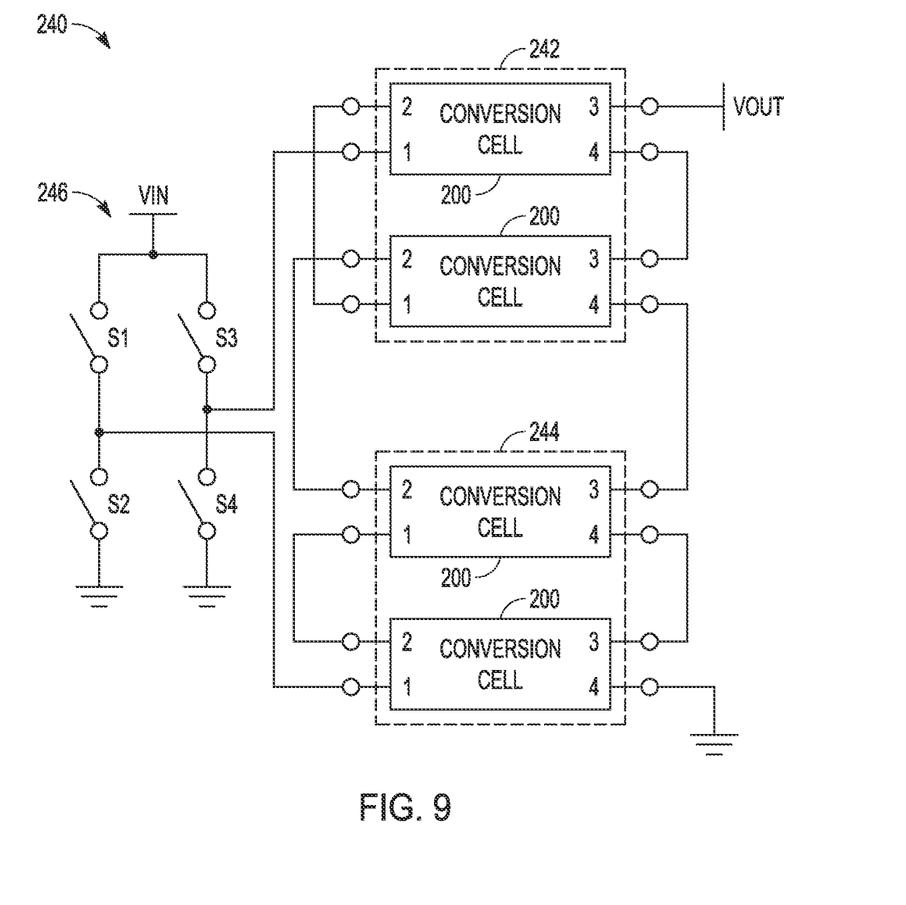
FIG. 9 is an embodiment of a Voltage Doubler in which a conversion cells with P=1 are connected in series to introduce an additional transformer pair and increase Vout at the load.

Referring now to FIG. 9, in another embodiment, a Voltage Doubler 240 is configured to increase the output voltage Vout that can be delivered to the load. Each conversion section 242, 244 includes R conversion cells each having a single secondary winding where R=2 in this example. The two secondary loops are connected in series within a given conversion section. The conversion sections 242, 244 are "stacked" to series connect the primary windings and to series-connect all four of the secondary loops. When driven by a switching network 246, the R transformers in each section source current through each secondary loop and an effective capacitance to multiply the voltage generated by each conversion section by R. if one conversion cell per section generates an output voltage of Vout, this configuration will generate an output voltage Vout*=R*Vout. Alternately, Vout may not change but each conversion cell is now only required to provide 1/2R*Vout.

For example, Terminals 1 and 2 may be connected in the same manner as shown in FIG. 8 to series-connect the primary windings. In each conversion section the output is taken at Terminal 3 of a top conversion cell 200 with Terminal 4 connected to Terminal 3 of a bottom conversion cell 200. The secondary loops are series-connected between conversion sections by connecting open Terminal 4 from the conversion section 242 to open Terminal 3 from the conversion section 244. The output is taken at Terminal 3 from conversion section 242 and Terminal 4 from conversion section 244 is connected to ground.

In a general topology, each of the conversion sections may include (O/P)*Q*R conversion cells that are isolated, connected in parallel, connected in series or a combination thereof within each conversion section to support O outputs with increased power delivered to the load or increased output voltage delivered to the load.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A double-ended dual magnetic DC-DC switching power converter (SPC), comprising:
first and second conversion cells, each conversion cell including a transformer T1 or T2 having a primary and a secondary winding and an output capacitor C1 or C2 and synchronous rectifier switch S1 or S2 connected in a secondary loop with the secondary winding,
wherein said first and second conversion cells are stacked to series-connect the primary windings and to series-connect the output capacitors C1 and C2 across an output;
an input circuit including a plurality of primary switches coupled to the series-connected primary windings;
a control circuit for controlling the plurality of primary switches to generate an alternating input voltage Vin across the series-connected primary windings in States A and C and to disconnect the input voltage Vin and short the primary windings in States B and D,
wherein in states A and C the control circuit switches the synchronous rectifier switches S1 and S2 in opposition to each other to alternately connect the secondary windings to the output to AC couple secondary winding currents through output capacitors C1 and C2 on alternate half cycles of the alternating input voltage Vin to source an output current at the output such that an output voltage Vout=VC1+VC2;
wherein in states B and D the control circuit closes both synchronous rectifier switches to connect the output capacitors C1 and C2 to the output, to equalize the voltages VC1 and VC2;
wherein Vout=Vin*(D/N) where D is a duty factor and N is the turns ratio of the first and second transformers.

2. The double-ended dual magnetic DC-DC SPC of claim 1, wherein output capacitor C1 equals output capacitor C2.

3. The double-ended dual magnetic DC-DC SPC of claim 1, wherein in states A and C the output capacitor C1 or C2 whose synchronous rectifier switch S1 or S2 is OPEN provides one-half of the output voltage Vout and the secondary winding current whose synchronous rectifier switch S1 or S2 is CLOSED is AC coupled through the opposing output capacitor C1 or C2 to provide the other half of the output voltage Vout where VC1=VC2=Vout/2.

4. The double-ended dual magnetic DC-DC SPC of claim 1, wherein in states B and D the output capacitors C1 and C2 are connected in series through an effective leakage inductance of transformers T1 and T2 to form Vout and equalize VC1 and VC2 and reset any charge imbalance between the output capacitors C1 and C2.

5. The double-ended dual magnetic DC-DC SPC of claim 1, wherein each transformer T1 and T2 includes P secondary windings where P>1 with each secondary winding connected to an output capacitor C1 or C2 and a synchronous rectifier switch S1 or S2 in a secondary loop, wherein the P secondary loops in the first and second conversion cells are stacked and series-connected, respectively, to series-connect effective output capacitances C1(i) and C2(i) for I=1 to P to produce output voltages Vout(i)=VC1(i)+VC2(i) across each of P outputs.

6. The double-ended dual magnetic DC-DC SPC of claim 1, further comprising:
   a first conversion section that includes Q>1 first conversion cells in which the primary windings are series-connected and the secondary loops are connected in parallel providing an effective output capacitance Ceff1; and
   a second conversion section that includes Q second conversion cells in which the primary windings are series-connected and the secondary loops are connected in parallel providing an effective output capacitance Ceff2; and
   wherein the first and second conversion sections are stacked to series-connect all of the primary windings and to series-connect the effective output capacitances Ceff1 and Ceff2 to generate an output voltage Vout=VCeff1+VCeff2.

7. The double-ended dual magnetic DC-DC SPC of claim 1, further comprising:
   a first conversion section that includes R>1 first conversion cells in which the primary windings are series-connected and the secondary loops are series-connected providing an effective output capacitance Ceff1; and
   a second conversion section that includes R second conversion cells in which the primary windings are series-connected and the secondary loops are series-connected providing an effective output capacitance Ceff2; and
   wherein the first and second conversion sections are stacked to series-connect all of the primary windings and to series-connect the effective output capacitances Ceff1 and Ceff2 to generate an output voltage Vout=VCeff1+VCeff2.

8. A double-ended dual magnetic DC-DC switching power converter comprising:
   first and second conversion sections, each conversion section including at least one conversion cell, each conversion cell including a transformer having a primary winding and at least one secondary windings, one or more secondary loops each connecting one secondary winding, an output capacitor and a synchronous rectifier switch, each conversion section including one or more secondary loops connected in parallel or in series to define effective capacitances Ceff1(i) and Ceff2(i) for one or more outputs i;
   wherein said first and second conversion sections are stacked to series-connect the primary windings and series-connect the effective output capacitances Ceff1(i) and Ceff2(i) across respective outputs;
   an input circuit including a plurality of primary switches coupled to the series-connected primary windings;
   a control circuit for controlling the plurality of primary switches to generate an alternating input voltage Vin across the series-connected primary windings in States A and C and to disconnect the input voltage Vin and short the primary windings in States B and D,
   wherein in states A and C the control circuit switches the synchronous rectifier switches in the first and second conversion sections in opposition to each other to alternately connect the secondary windings to the output to AC couple secondary winding currents through effective output capacitances Ceff1(i) and Ceff2(i) on alternate half cycles of the alternating input voltage Vin to source an output current at each of the one or more outputs such that an output voltage Vout(i)=VCeff1(i) VCeff2(i);
   wherein in states B and D the control circuit closes both synchronous rectifier switches to connect the output capacitances Ceff1(i) and Ceff2(i) to the respective output to equalize the voltages VCeff1(i) and VCeff2(i);
   wherein Vout(i)=Vin*(D/Neff(i)) where D is a duty factor and Neff(i) is an effective turns ratio of the transformers for each output.

9. The double-ended dual magnetic DC-DC SPC of claim 8, wherein in states A and C the effective output capacitance C1eff or C2eff whose synchronous rectifier switches S1 or S2 are OPEN provides one-half of the output voltage Vout(i) and the secondary winding current whose synchronous rectifier switches S1 or S2 is CLOSED is AC coupled through the opposing effective output capacitance C1eff or C2eff to provide the other half of the output voltage Vout where VC1eff(i)=VC2eff(i)=Vout(i)/2.

10. The double-ended dual magnetic DC-DC SPC of claim 8, wherein in states B and D the effective output capacitances C1eff(i) and C2eff(i) are connected together through an effective leakage inductance of the transformers to equalize VC1eff(i) and VC2eff(i) and reset any charge imbalance between the effective output capacitances C1eff and C2eff.

11. The double-ended dual magnetic DC-DC SPC of claim 8, wherein each transformer includes a plurality of secondary windings with each secondary winding connected to an output capacitor C1 or C2 and a synchronous rectifier switch S1 or S2 in a secondary loop, wherein the corresponding plurality of secondary loops in the first and second conversion sections are stacked and series-connected, respectively, to series-connect effective output capacitances C1(i) and C2(i) to produce output voltages Vout(i)=VC1(i)+VC2(i) for each of a plurality of outputs.

12. The double-ended dual magnetic DC-DC SPC of claim 8, further comprising:
   a first conversion section that includes a plurality of first conversion cells in which the primary windings are series-connected and the secondary loops are connected in parallel providing an effective output capacitance Ceff1; and
   a second conversion section that includes the same plurality of second conversion cells in which the primary windings are series-connected and the secondary loops are connected in parallel providing an effective output capacitance Ceff2; and
   wherein the first and second conversion sections are stacked to series-connect all of the primary windings and to series-connect the effective output capacitances Ceff1 and Ceff2 to generate an output voltage Vout=VCeff1+VCeff2.

13. The double-ended dual magnetic DC-DC SPC of claim 8, further comprising:
a first conversion section that includes a plurality of first conversion cells in which the primary windings are series-connected and the secondary loops are series-connected providing an effective output capacitance Ceff1; and
a second conversion section that includes the same plurality of second conversion cells in which the primary windings are series-connected and the secondary loops are series-connected providing an effective output capacitance Ceff2; and
wherein the first and second conversion sections are stacked to series-connect all of the primary windings and to series-connect the effective output capacitances Ceff1 and Ceff2 to generate an output voltage Vout=VCeff1+VCeff2.

14. A double-ended dual magnetic DC-DC switching power converter comprising:
first and second conversion sections, each conversion section including at least one conversion cell, each conversion cell including a transformer having a primary winding and P secondary windings, P secondary loops each connecting one secondary winding, an output capacitor and a synchronous rectifier switch, each conversion section including Q secondary loops connected in parallel and R secondary loops connected in series for each of the Q secondary loops to define effective capacitances Ceff1(i) and Ceff2(i) for I=1 to O for each of O outputs where O, P, Q and R are integers of one or more;
wherein said first and second conversion sections are stacked to series-connect the primary windings and series-connect the effective output capacitances Ceff1(i) and Ceff2(i) across each of the O outputs;
an input circuit including a plurality of primary switches coupled to the series-connected primary windings;
a control circuit for controlling the plurality of primary switches to generate an alternating input voltage Vin across the series-connected primary windings in States A and C and to disconnect the input voltage Vin and short the primary windings in States B and D,
wherein in states A and C the control circuit switches the synchronous rectifier switches in the first and second conversion sections in opposition to each other to alternately connect the secondary windings to the output to AC couple secondary winding currents through effective output capacitances Ceff1(i) and Ceff2(i) on alternate half cycles of the alternating input voltage Vin to source an output current at each of the 0 outputs such that an output voltage Vout(i)=VCeff1(i)+VCeff2(i);
wherein in states B and D the control circuit closes both synchronous rectifier switches to connect the output capacitances Ceff1(i) and Ceff2(i) to the respective output to equalize the voltages VCeff1(i) and VCeff2(i);
wherein Vout (i)=Vin*(D)/Neff(i)) where D is a duty factor and Neff(i) is an effective turns ratio of the transformers for each of the O outputs.

15. The double-ended dual magnetic DC-DC SPC of claim 14, wherein in states A and C the effective output capacitance Ceff1(i) or Ceff2(i) whose synchronous rectifier switch S1 or S2 is OPEN provides one-half of the output voltage Vout(i) and the secondary winding current whose synchronous rectifier switch S1 or S2 is CLOSED is AC coupled through the opposing effective output capacitance Ceff1(i) or Ceff2(i)to provide the other half of the output voltage Vout(i) where VC1eff(i)=VC2eff(i)=Vout(i)/2.

16. The double-ended dual magnetic DC-DC SPC of claim 14, wherein in states B and D the effective output capacitance Ceff1(i) or Ceff2(i) are connected together through an effective leakage inductance of transformers the transformers to equalize VC1 and VC2 and reset any charge imbalance between the effective output capacitance Ceff1(i) or Ceff2(i).

17. The double-ended dual magnetic DC-DC SPC of claim 14, where O=P=Q=R=1.

18. The double-ended dual magnetic DC-DC SPC of claim 14, wherein P=O>1 with each secondary winding connected to an output capacitor and a synchronous rectifier switch S1 or S2 in a secondary loop, wherein the P secondary loops in the first and. second conversion sections are stacked and series-connected, respectively, across each of O outputs.

19. The double-ended dual magnetic DC-DC SPC of claim 14, wherein Q>1 with each conversion section including a plurality of Q conversion cells in which the primary windings are series-connected and the secondary loops are connected in parallel.

20. The double-ended dual magnetic DC-DC SPC of claim 14, wherein R>1 with each conversion section including a plurality of R conversion cells in which the primary windings are series-connected and the secondary loops are series-connected.

* * * * *

UNITED STATES PATENT AND TRADEMARK OFFICE
CERTIFICATE OF CORRECTION

PATENT NO. : 11,705,823 B2
APPLICATION NO. : 17/546642
DATED : July 18, 2023
INVENTOR(S) : Perry et al.

It is certified that error appears in the above-identified patent and that said Letters Patent is hereby corrected as shown below:

In the Specification

In Column 2, Line 20, delete "filtering," and insert --filtering.-- therefor

In Column 2, Line 60, delete "lits" and insert --Its-- therefor

In Column 3, Line 59, delete "Vout=VC1eff=VC2eff." insert --Vout=VC1eff+VC2eff.-- therefor In Column 4, Line 8, delete ""stacked"O" and insert --"stacked"-- therefor In Column 4, Line 17, delete "(p=1)" and insert --(P=1)-- therefor In Column 4, Line 44, delete "(O/P)*(Q*R" and insert --(O/P)*Q*R-- therefor In Column 4, Line 59, delete "DC:" and insert --DC-- therefor In Column 5, Line 38, delete "a." and insert --a-- therefor In Column 6, Line 58, delete "126" and insert --128-- therefor In Column 7, Line 5, delete "V2" and insert --½-- therefor In Column 7, Line 37, delete "capacitors," and insert --capacitors.-- therefor In Column 8, Line 16, delete "Vitt-Vow" and insert --Vin-Vout-- therefor In Column 9, Line 63, delete "if" and insert --If-- therefor Signed and Sealed this
Twelfth Day of November, 2024

Katherine Kelly Vidal
*Director of the United States Patent and Trademark Office*

CERTIFICATE OF CORRECTION (continued)
U.S. Pat. No. 11,705,823 B2

In the Claims

In Column 10, Line 54, in Claim 1, delete "output," and insert --output-- therefor In Column 12, Line 13, in Claim 8, delete "Ceffl(i)" and insert --Ceff1(i)-- therefor In Column 12, Lines 16-17, in Claim 8, delete "Vout(i)=VCeff1(i) VCeff2(i);" and insert --Vout(i)=VCeff1(i)+VCeff2(i);-- therefor In Column 14, Line 4, in Claim 14, delete "0" and insert --O-- therefor In Column 14, Line 11, in Claim 14, delete "(i)=Vin*(D)/Neff(i))" and insert --(i)=Vin*(D/Neff(i))-- therefor In Column 14, Line 36, in Claim 18, delete "and." and insert --and-- therefor